US009824374B1

(12) United States Patent
Bobe et al.

(10) Patent No.: US 9,824,374 B1
(45) Date of Patent: Nov. 21, 2017

(54) RADIO ACCESS NETWORK ADAPTIVE MOBILE ADVERTISEMENT DELIVERY

(71) Applicant: Sprint Communications Company L.P., Overland Park, KS (US)

(72) Inventors: Brooke M. Bobe, Overland Park, KS (US); Volkan Sevindik, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 397 days.

(21) Appl. No.: 14/463,641

(22) Filed: Aug. 19, 2014

(51) Int. Cl.
*G06Q 30/02* (2012.01)
*H04W 24/04* (2009.01)
*H04W 28/02* (2009.01)
*H04M 3/487* (2006.01)
*H04W 84/04* (2009.01)

(52) U.S. Cl.
CPC ........ *G06Q 30/0267* (2013.01); *H04W 24/04* (2013.01); *H04W 84/042* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0025149 A1* | 2/2006 | Karaoguz | .......... | H04N 21/4126 455/452.2 |
| 2006/0025151 A1* | 2/2006 | Karaoguz | ......... | H04L 29/06027 455/455 |
| 2008/0248779 A1* | 10/2008 | Tsui | ....... | H02J 7/0055 455/408 |
| 2009/0116384 A1* | 5/2009 | Kim | ......... | H04L 47/15 370/230 |
| 2010/0227630 A1* | 9/2010 | Takala | ............... | G06Q 30/0276 455/466 |
| 2011/0202947 A1* | 8/2011 | Gupta | .............. | H04N 21/26266 725/14 |
| 2011/0209181 A1* | 8/2011 | Gupta | .................... | H04N 7/163 725/62 |
| 2012/0036541 A1* | 2/2012 | Kotecha | ............ | H04N 21/2385 725/62 |

(Continued)

FOREIGN PATENT DOCUMENTS

WO    WO 03038638 A1 *   5/2003   ........... H04H 20/103

*Primary Examiner* — William A Brandenburg (57) ABSTRACT

An ad gateway is disclosed. The ad gateway comprises a processor, a memory, and an application stored in the memory. The application when executed by the processor, determines a type of network connection by which a mobile communication device is communicatively coupled to a communication network and a current quality of service (QOS) level of the communication network. The application then selects an advertisement type based on the type of network connection and based on the current QoS level of the communication network. The application then requests an advertisement of the selected type for the mobile communication device from an advertisement data store, wherein the advertisement types comprise a static image type, an animation type, a video type, and a high definition video type. The application then receives the advertisement from the advertisement data store. The application then transmits the advertisement to the mobile communication device.

15 Claims, 7 Drawing Sheets

(56) References Cited

U.S. PATENT DOCUMENTS

| | | | | |
|---|---|---|---|---|
| 2012/0252494 | A1* | 10/2012 | Parker | H04W 4/02 455/456.3 |
| 2014/0140211 | A1* | 5/2014 | Chandrasekaran | H04W 28/0268 370/235 |
| 2014/0160924 | A1* | 6/2014 | Pfautz | H04L 47/2441 370/235 |
| 2014/0233430 | A1* | 8/2014 | Russell | H04M 11/08 370/259 |
| 2015/0016256 | A1* | 1/2015 | Skog | H04W 28/14 370/235 |
| 2015/0112767 | A1* | 4/2015 | Shatzkamer | G06Q 30/0205 705/7.34 |
| 2015/0181409 | A1* | 6/2015 | Chang | H04W 8/18 455/410 |
| 2015/0208275 | A1* | 7/2015 | Kakadia | H04L 47/824 370/230 |
| 2015/0236909 | A1* | 8/2015 | Valluri | H04L 41/0836 370/229 |
| 2015/0289231 | A1* | 10/2015 | Basra | H04W 72/1242 370/312 |
| 2016/0050589 | A1* | 2/2016 | Safavi | H04W 36/0033 455/436 |
| 2017/0064609 | A1* | 3/2017 | Park | H04L 12/189 |

\* cited by examiner

RADIO ACCESS NETWORK ADAPTIVE MOBILE ADVERTISEMENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications networks have changing network dynamics in terms of data rate and delay. Advertisements are delivered to mobile communication devices through advertisement application programming interfaces (APIs). If the telecommunication network that the mobile communication devices are communicatively coupled to is congested or if the mobile communication devices have poor connections to the network at particular locations, requested advertisements might not be shown to users of the mobile communication devices. These times of congestion may lead to poor advertisement performance, bad user experiences, and inefficient use of mobile communication device capabilities.

SUMMARY

In an embodiment, an ad gateway is disclosed. The ad gateway comprises a processor, a memory, and an application stored in the memory. The application when executed by the processor determines a type of network connection by which a mobile communication device is communicatively coupled to a communication network and a current quality of service (QoS) level of a communication network. The application then selects an advertisement type based on the type of network connection and based on the current QoS level of the communication network. The application then requests an advertisement of the selected type for the mobile communication device from an advertisement data store, wherein the advertisement types comprise a static image type, an animation type, a video type, and a high definition video type. The application then receives the advertisement from the advertisement data store. The application then transmits the advertisement to the mobile communication device.

In an embodiment, a method of determining a type of advertisement to transmit to a mobile communication device is disclosed. The method comprises an ad gateway determining a type of network connection by which a mobile communication device communicatively coupled to a communication network. The method further comprises the ad gateway selecting an advertisement type based on the network connection type, wherein the advertisement types comprise a static image type, an animation type, a video type, and a high definition video type. The method further comprises the ad gateway requesting for an advertisement of the selected type from an advertisement data store. The method further comprises the ad gateway receiving the selected advertisement from the advertisement data store. The method further comprises the ad gateway transmitting the advertisement to the mobile communication device.

In an embodiment, a method of determining a plurality of types of advertisements and a sequence of advertisements to transmit to a mobile communication device is disclosed. The method comprises an ad gateway determining a current quality of service (QoS) level of a communication network. The method further comprises the ad gateway determining a type of network connection by which a mobile communication device is coupled to the communication network. The method further comprises selecting a first advertisement type and a second advertisement type based in the current QoS and network connection type, wherein the second advertisement type is a richer advertisement type than the first advertisement type, wherein the advertisement types comprise a static image type, an animation type, a video type, and a high definition video type. The method further comprises the ad gateway requesting a first advertisement of the first type and a second advertisement of the second type. The method further comprises the ad gateway sending the first advertisement to the mobile communication device. The method further comprises after sending the first advertisement to the mobile communication, the ad gateway sends the second advertisement to the mobile communication device, wherein the first advertisement is sent to the mobile communication device for filling a first slot in a display of the mobile communication device, and the second advertisement is sent to the mobile communication device for filling a second advertisement slot in the display, wherein the second advertisement slot is located below the first advertisement slot in the display.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Presenting advertisements adjacent to user requested content, for example a requested web page, in a timely manner may prove problematic for telecommunications service providers. If an advertisement is not delivered timely to a mobile communication device the advertisement may not be seen by a user of a mobile communication device, or a mobile communication service subscriber, as they read the content from top to bottom. Additionally, if the subscriber begins to read the rendered content and an advertisement is then put into the display, pushing down the desired content, the subscriber may get irritated by the intrusion and need to scroll to the location in the content where he or she had been reading. There are several factors that contribute towards delivering an advertisement in a timely manner: one, a type of network connection by which a mobile communication device is communicatively coupled to a network; and two, a current quality of service (QoS) level of the communication network that the mobile communication device is communicatively coupled to. In an embodiment, the level of activity on a communication network may be another factor that contributes to delivering an advertisement in a timely manner.

Determining these factors and sending a suitable type of advertisement that can be sent timely to a mobile communication device based on these factors may prove useful to telecommunications service providers. For example, a subscriber's mobile communication device may be communicatively coupled to a 3G network, the 3G network may have a low current QoS level, and the communication network may have a high level of activity. In this example, to increase the likelihood that an advertisement transits the network timely, thereby promoting presentation of the ad on the mobile device of the user at about the same time that user requested content is rendered, it would be advantageous to select and send a static image type of advertisement, which uses less bandwidth, as opposed to a high definition video advertisement. In another example, a subscriber's mobile communication device may be communicatively coupled to a long term evolution (LTE) network, the LTE network may have a high current QoS level, and the communication network may have a low amount of activity. In this case, a high definition video advertisement may be selected to be sent to the mobile communication device as the network is capable of sending the advertisement to the mobile communication device in a timely manner.

The current disclosure teaches a mechanism by which to select different types of advertisements for sending to a mobile communication device based on several factors using an ad gateway. When requested to send an advertisement to a mobile communication device, the ad gateway determines a type of network connection by which the mobile communication device is communicatively coupled to a communication network and a current quality of service (QoS) level of the communication network. In an embodiment, there are 9 levels of QoS that are referred to as QoS class identifiers (QCI). In an embodiment, QCI 9 represents a worst QoS level and QCI 1 represents a best QoS level. In an embodiment, static image advertisements may be selected for and sent to the mobile communication device at QCI 9 and high definition video advertisements may be selected for and sent to a mobile communication device at around QCIs 2 or 3. The ad gateway then selects an advertisement type based on the network connection type and the current QoS of the communication network. In an embodiment, the advertisement types may comprise a static image type, an animation type, a video type, and a high definition video type. The ad gateway then requests an advertisement of the selected type from an advertisement data store. The ad gateway receives the advertisement of the selected type and then transmits the advertisement to the mobile communication device.

In an embodiment, the ad gateway may send a sequence of advertisements to a mobile communication device. The ad gateway may determine the type of network connection by which a mobile communication device is communicatively coupled to a communication network and a current QoS level of the communication network. Based on the determination, the ad gateway selects a first advertisement of a first type and a second advertisement of a second type. The ad gateway then requests for these advertisements from the advertisement data store. In an embodiment, the first advertisement type is an advertisement type of lower quality and the second advertisement type is an advertisement type of higher quality, where an advertisement of higher quality is an advertisement that comprises more bits than an advertisement of lower quality. A higher quality advertisement may comprise richer content, for example more dynamic video content versus more static still images or animated images. The ad gateway then transmits the first advertisement first and the second advertisement second to the mobile communication device. In an embodiment, the delivery of advertisements is subject to time constraints and reaching the destination in a timely manner for display. The delivery of advertisements may also be subject to the delay, throughput, and other factors that the communication network is experiencing.

In an embodiment, the first advertisement is sent to the mobile communication device for filling a first advertisement slot in a display of the mobile communication device, and the second advertisement is sent to the mobile communication device for filling a second advertisement slot in the display of the mobile communication device. The second advertisement slot is located below the first advertisement slot in the display of the mobile communication device, giving the higher quality second advertisement more time to transit the network and connection to arrive and be presented on the display of the mobile communication device. In an embodiment, the second advertisement slot may be below the bottom edge of the display of the mobile communication device when a page is initially displayed on the mobile communication device. This is so a higher quality or richer advertisement with more bits will have time to transit the network as a subscriber may look at the display of the mobile communication device from the top to the bottom while scrolling down a web page. With time to transit the network, the richer advertisement that is below the bottom edge of the display may be able to transit the network and be displayed for the subscriber to see by the time they scroll down to or read down to the bottom of the subject content. In an embodiment, the first advertisement may be sent first and the second advertisement may be sent second after a delay of a predefined period of time to give the first advertisement a more opportunity to transit the network, thereby avoiding the second advertisement contending with the first advertisement for possibly limited network bandwidth. With the ad gateway that determines a type of network connection by which a mobile communication device is communicatively coupled to a communication network, a current QoS level of the communication network, and the current level of activity on the communication network, an advertisement type that is the suitable quality may be selected by the ad gateway to transit the network when sent by the ad gateway to a mobile communication device.

Figure 1:
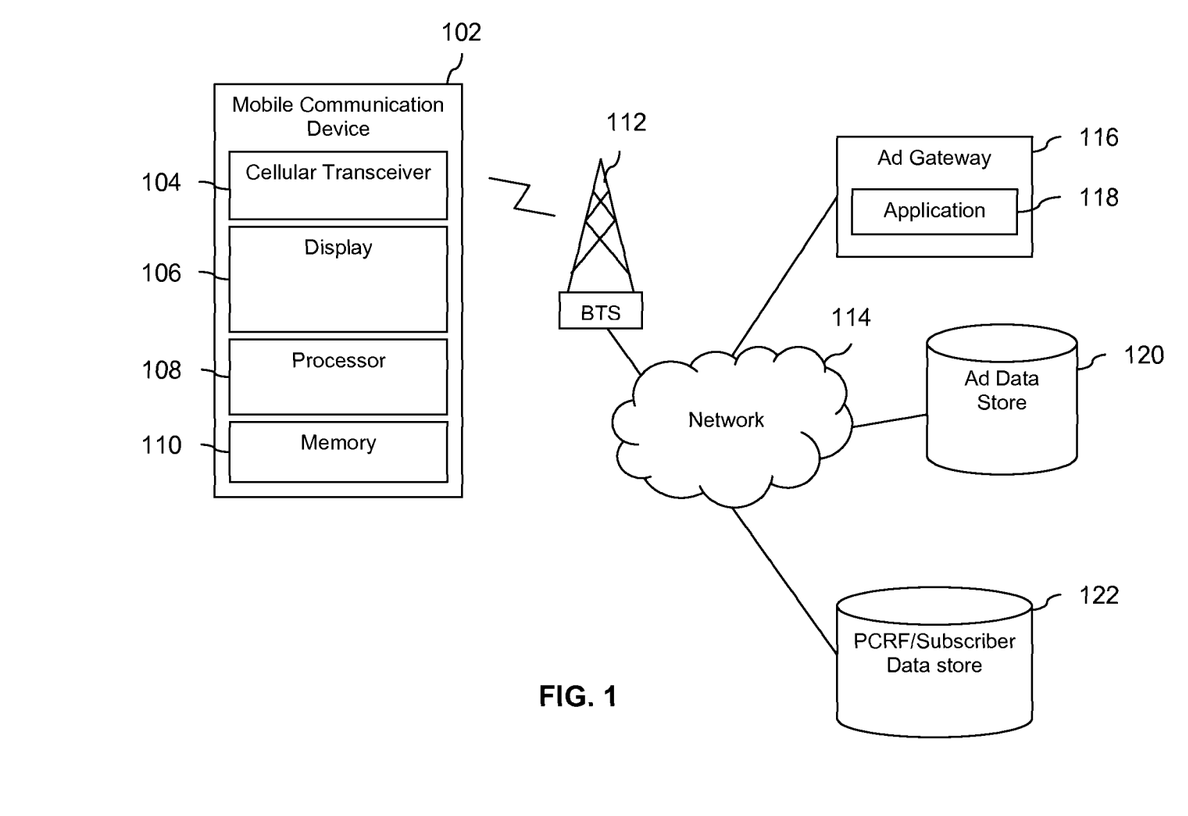
FIG. 1 is a block diagram of a system according to an embodiment of the disclosure.

Turning now to FIG. 1, a system 100 is described. In an embodiment the system 100 comprises a mobile communication device 102, a base transceiver station (BTS) 112, a network 114, an ad gateway 116, an advertisement data store 120, and a policy and charging rules function (PCRF) and subscriber data store 122. The mobile communication device 102 comprises a cellular transceiver 104, a display 106, a processor 108, and a memory 110. The ad gateway 116 comprises an application 118 stored in a memory. The ad gateway 116 may be implemented as a computer. In some contexts, the application 118 may be referred to as the ad gateway and the ad gateway application may be said to execute on a computer. The advertisement data store 120, the PCRF and subscriber data store 122 may be implemented as computers. Alternatively, access to the data stores 120, 122 may be mediated by computers. The BTS 112, the ad gateway 116, the advertisement data store 120, and the PCRF/subscriber data store 122 are communicatively coupled to the network 114. In an embodiment, there may be a packet data network gateway (PGW) data store or other data stores besides the PCRF/subscriber data store 122 and the advertisement data store 120. In an embodiment, the network 114 is a private communication network, a public communication network, or a combination thereof.

In an embodiment, the BTS 112 provides a wireless communication link to the mobile communication device 102 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While one mobile communication device 102 and one BTS 112 are illustrated in FIG. 1, it is understood that the system 100 may comprise any number of BTSs 112 or mobile communication devices 102. In an embodiment, the mobile communication device 102 is one of a mobile phone, a personal digital assistant (PDA), a headset computer, a wearable computer, a media player, or other types of mobile communication devices. In an embodiment, the mobile communication device 102 may be implemented as a handset. Details of handsets are discussed further hereinafter. In an embodiment, the mobile communication device 102 may be a laptop computer, a tablet computer, or a notepad computer.

The application 118 determines a type of network connection by which the mobile communication device 102 is connected to the network 114. In an embodiment, the types of network connections may comprise a 3G network connection, a 4G network connection, a 4G LTE network connection, or other types of network connections. The application 118 further determines a current quality of service (QoS) level of the network 114 that the mobile communication device 102 is communicatively coupled to. In an embodiment, there may be 9 levels of QoS that are referred to as QoS class identifiers (QCIs). QCI 9 may represent a worst QoS level and QCI 1 may represent a best QoS level. In an embodiment, there may be 255 QoS levels or other ranges of QoS levels. In an embodiment, static image advertisements may be sent to the mobile communication device 102 at QCI 9 and high definition (HD) video advertisements may be sent to a mobile communication device 102 at around QCIs 2-3. In an embodiment, the information about QoS level may be accessed in the PCRF/subscriber data store 122 or the mobile communication device 102. For example, the current performance of the network 114 may be monitored, scored, and stored in the PCRF/subscriber data store 122, and the application 118 may read this QoS score or metric from the PCRF/subscriber data store 122. In an embodiment, the application 118 may also determine a level of activity on the network 114.

Based on these factors, the application 118 may select a type of advertisement to transmit to the mobile communication device 102. In an embodiment, the types of advertisements that the application 118 may select from comprise a static image type, an animation type, a video type, and a high definition video type. These different types or formats of advertisements have different content sizes, i.e., comprised of different numbers of bits. Static images may be comprised of the least number of bits of the aforementioned types of advertisements and HD videos may typically be comprised of the most number bits of the aforementioned types of advertisements. It is desired by telecommunications service providers to send an advertisement that transits the network 114 to the mobile communication device 102 in a short amount of time. As network QoS varies, so too does the size of advertisement that can transit the network 114 in a short amount of time. By selecting the type of advertisement based on the conditions of the network 114 and/or the type of connection of the device 102 it is expected that the richest advertisement content can be sent subject to the constraint that the ad can be delivered timely. The application 118 makes its selection of an advertisement type and requests an advertisement of the selected advertisement type from the advertisement data store 120. The application 118 receives the requested advertisement from the advertisement data store 120 and sends the advertisement to the mobile communication device 102 where it may be displayed on the display 106. The application 118 may also select a sequence of advertisements of different or same advertisement types to transmit to the mobile communication device 102.

The advertisement data store 120 comprises advertisements that the application 118 transmits to the mobile communication device 102. The types of advertisements that the advertisement data store 120 may contain are a static image type, an animation type, a video type, a high definition video type, or other types of advertisements. The PCRF/subscriber data store 122 comprises information about the QoS of the network 114 to which the mobile communication device 102 is connected. The PCRF/subscriber data store 122 may additionally comprise information about the subscriber that is associated with the mobile communication device 102. The information about the subscriber in the PCRF/subscriber data store 122 may comprise a name, a gender, an age, height, weight, hair color, an occupation, a salary, or other facets of information about the subscriber that is associated with the mobile communication device 102.

In an embodiment, the application 118 is executed by a processor of the ad gateway 116 when it receives a request from the mobile communication device 102 for an advertisement to display. The application 118 is designed to determine, select, and send an advertisement of the highest quality or most bits possible that may transit the network to the mobile communication device 102 in a timely manner based on several factors. The application 118 accesses the mobile communication device 102 and determines a type of network connection by which the mobile communication device 102 is communicatively coupled to the network 114. In an embodiment, the types of network connections by which the mobile communication device 102 may be communicatively coupled to the network 114 may comprise a 3G network connection, a 4G network connection, a 4G LTE network connection, or other types of network connections.

The application 118 further accesses the PCRF/subscriber data store 122 to determine a current QoS level of the network 114. In an embodiment, the network QoS level may be determined based on latency, throughput, jitter, and error rate that the network 114 is experiencing. In an embodiment, the network QoS level may be determined based on data and/or performance metrics stored in the PCRF/subscriber data store 122. In an embodiment, there may be 9 levels of QoS that may be referred to as QoS class identifiers (QCIs). QCI 9 may represent a worst QoS level and QCI 1 may represent a best QoS level. A static image advertisement may be sent to the mobile communication device 102 when the QoS level is at QCI 9, and a high definition video advertisement may be sent to the mobile communication device 102 when the QoS level is around QCI 2 or 3. In an embodiment, there may be more or less than 9 QCIs. In an embodiment, the application 118 may determine the level of activity that the network 114 is experiencing. In an embodiment, the mobile communication device 102 may compile the information that the application 118 tries to determine into a report that it sends to the application 118 when the mobile communication device 102 requests an advertisement to display. The report may comprise information about the type of mobile communication device that the mobile communication device 102 is and other information that the application 118 may want.

After determining the type of network connection by which the mobile communication device 102 is communicatively coupled to the network 114 and the QoS level of the network 114, the application 118 selects a type of advertisement that it will transmit to the mobile communication device 102. The types of advertisements that the application 118 may select from comprise a static image type, an animation type, a video type, and a high definition video type. For an example, the mobile communication device 102 may be communicatively coupled to the network 114 by a 4G network connection, the network 114 may be experiencing a QCI 4 or 5, and the network 114 may have a low level of activity; with the determined information, the application 118 may select an animation or video advertisement to send to the mobile communication device 102 based on the available advertisements in the advertisement data store. In another example, the mobile communication device 102 may be communicatively coupled to the network 114 by a 3G network connection, the network 114 may be experiencing a QCI 9, and there may be a high level of activity; with the determined information, the application 118 may select a static image advertisement to send to the mobile communication device 102. The delivery of the advertisement types is subject to the time constraints of reaching the destination in a timely manner for display, e.g., the mobile communication device 102. If a video advertisement can be delivered in a timely manner, the application 118 may select a video advertisement. If a static image advertisement is the only advertisement type that may traverse the network 114 and be delivered to the mobile communication device 102 for display, a static image advertisement may be sent.

The application 118 then sends a request for an advertisement of the selected type from the advertisement data store 120. The application 118 receives the advertisement of the selected type from the advertisement data store 120 and then transmits it to the mobile communication device 102 where it may be displayed on the display 106. This procedure supports the timely display of advertisements.

In an embodiment, the application 118 of the ad gateway 116 may send a sequence of advertisements to a mobile communication device 102. The application 118 may determine the type of network connection by which a mobile communication device 102 is communicatively coupled to the communication network 114 and a current QoS level of the network 114. Based on the determination, the application 118 selects a first advertisement of a first type and a second advertisement of a second type. The application 118 then requests for these advertisements from the advertisement data store 120. In an embodiment, the first advertisement type is an advertisement type of lower quality and the second advertisement type is an advertisement type of higher quality, a lower quality advertisement uses less bandwidth and a higher quality advertisement uses more bandwidth. The application 118 then transmits the first advertisement first and the second advertisement second to the mobile communication device 102.

In an embodiment, the first advertisement is sent to the mobile communication device 102 for filling a first slot in the display 106 of the mobile communication device 102, and the second advertisement is sent to the mobile communication device 102 for filling a second advertisement slot in the display 106 of the mobile communication device 102. The second advertisement slot is located below the first advertisement slot in the display 106 of the mobile communication device 102, giving the higher quality second advertisement more time to transit the network 114 and be presented on the display 106 of the mobile communication device 102 before the subscriber sees the advertisement. In an embodiment, the second advertisement slot may be below the bottom edge of the display 106 of the mobile communication device 102 when a web page is initially displayed on the mobile communication device 102. This is so the higher quality or richer advertisement will have time to transit the network 114 as a subscriber may look at the display 106 of the mobile communication device 102 from the top to the bottom while scrolling down the web page. With time to transit, the higher quality or richer advertisement that is below the bottom edge of the display 106 of the mobile communication device 102 may be able to be displayed for the subscriber to see.

Figure 2:
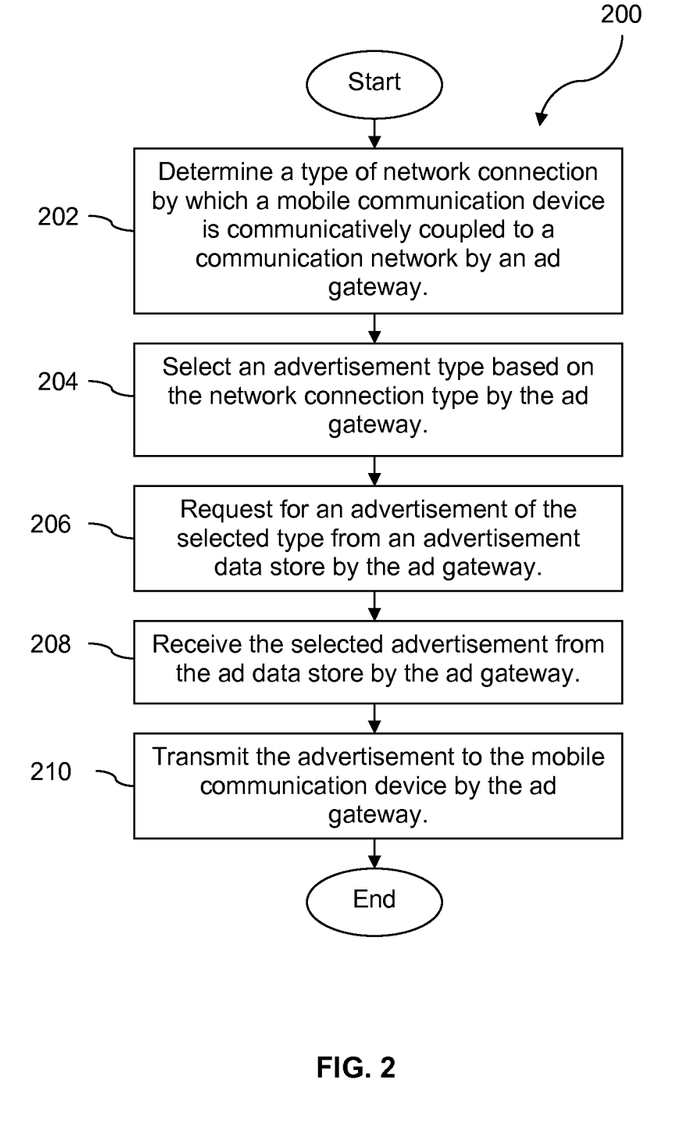
FIG. 2 is a flow chart of a method according to an embodiment of the disclosure.

In FIG. 2, a method 200 is described. At block 202, an ad gateway determines a type of network connection by which a mobile communication device is communicatively coupled to a communication network. At block 204, the ad gateway selects an advertisement type based on the network connection type. At block 206, the ad gateway requests an advertisement of the selected type from an advertisement data store. At block 208, the ad gateway receives the selected advertisement from the advertisement data store. At block 210, the ad gateway transmits the advertisement to the mobile communication device.

Figure 3:
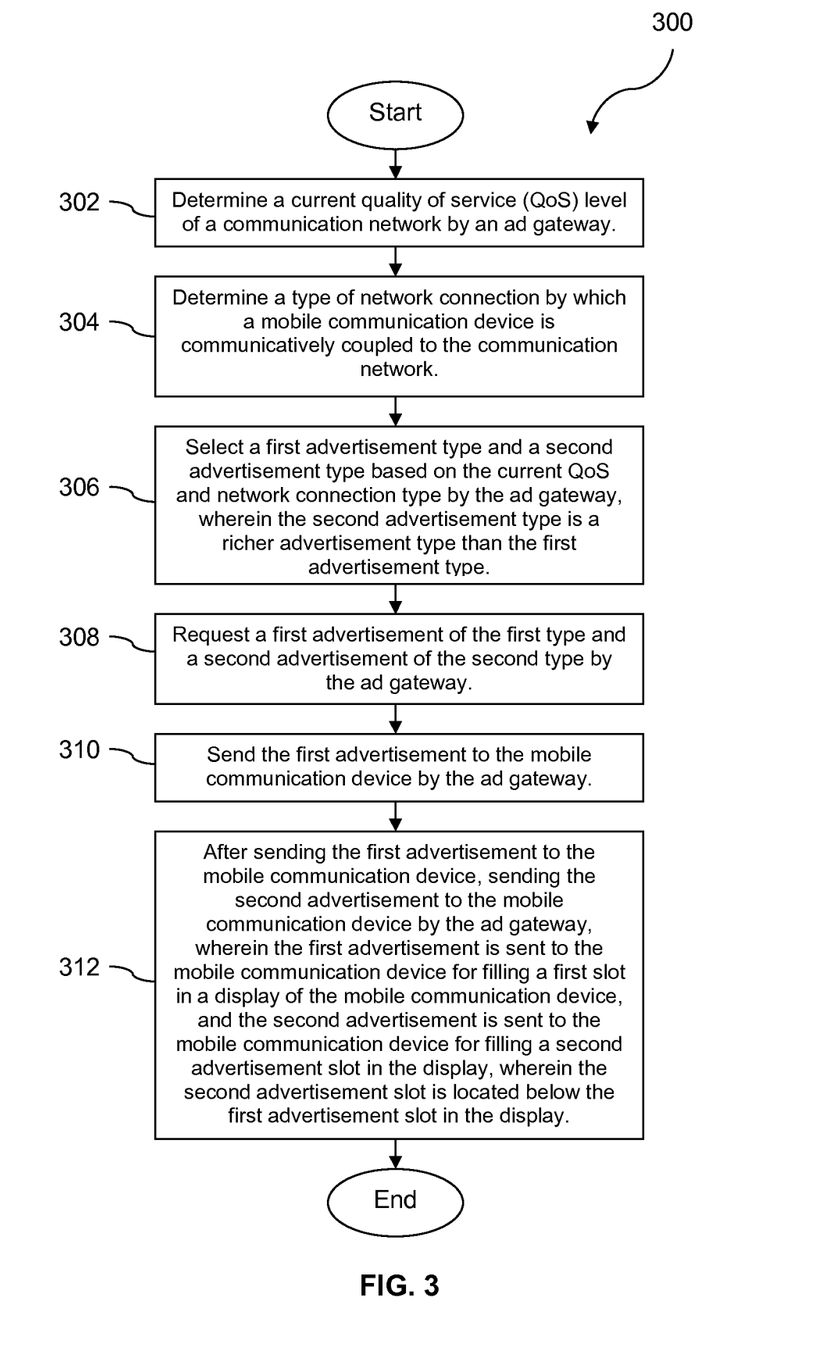
FIG. 3 is a flow chart of a method according to an embodiment of the disclosure.

In FIG. 3, a method 300 is described. At block 302, an ad gateway determines a current quality of service (QoS) level of a communication network. At block 304, the ad gateway determines a type of network connection by which a mobile communication device is communicatively coupled to the communication network. At block 306, the ad gateway selects a first advertisement type and a second advertisement type based on the current network QoS and network connection type by which the mobile communication device is communicatively coupled to the communication network, wherein the second advertisement type is a richer advertisement type than the first advertisement type. At block 308, the ad gateway requests a first advertisement of the first type and a second advertisement of the second type. In an embodiment, the ad gateway requests for the advertisements from an advertisement data store. At block 310, the ad gateway sends the first advertisement to the mobile communication device. At block 312, after sending the first advertisement to the mobile communication device the ad gateway sends the second advertisement to the mobile communication device, wherein the first advertisement is sent to the mobile communication device for filling a first slot in a display of the mobile communication device, and the second advertisement is sent to the mobile communication device for filling a second advertisement slot in the display, wherein the second advertisement slot is located below the first advertisement slot in the display.

Figure 4:
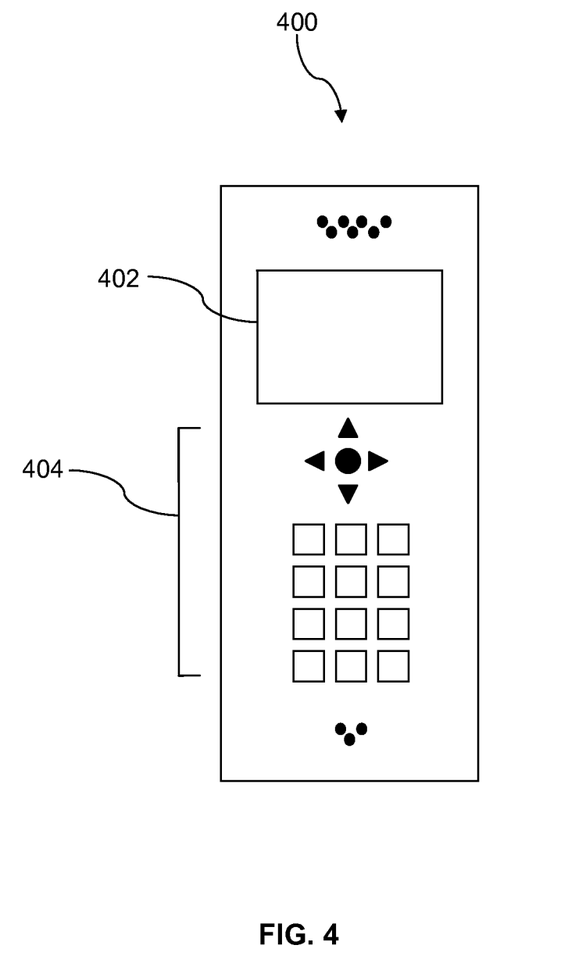
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
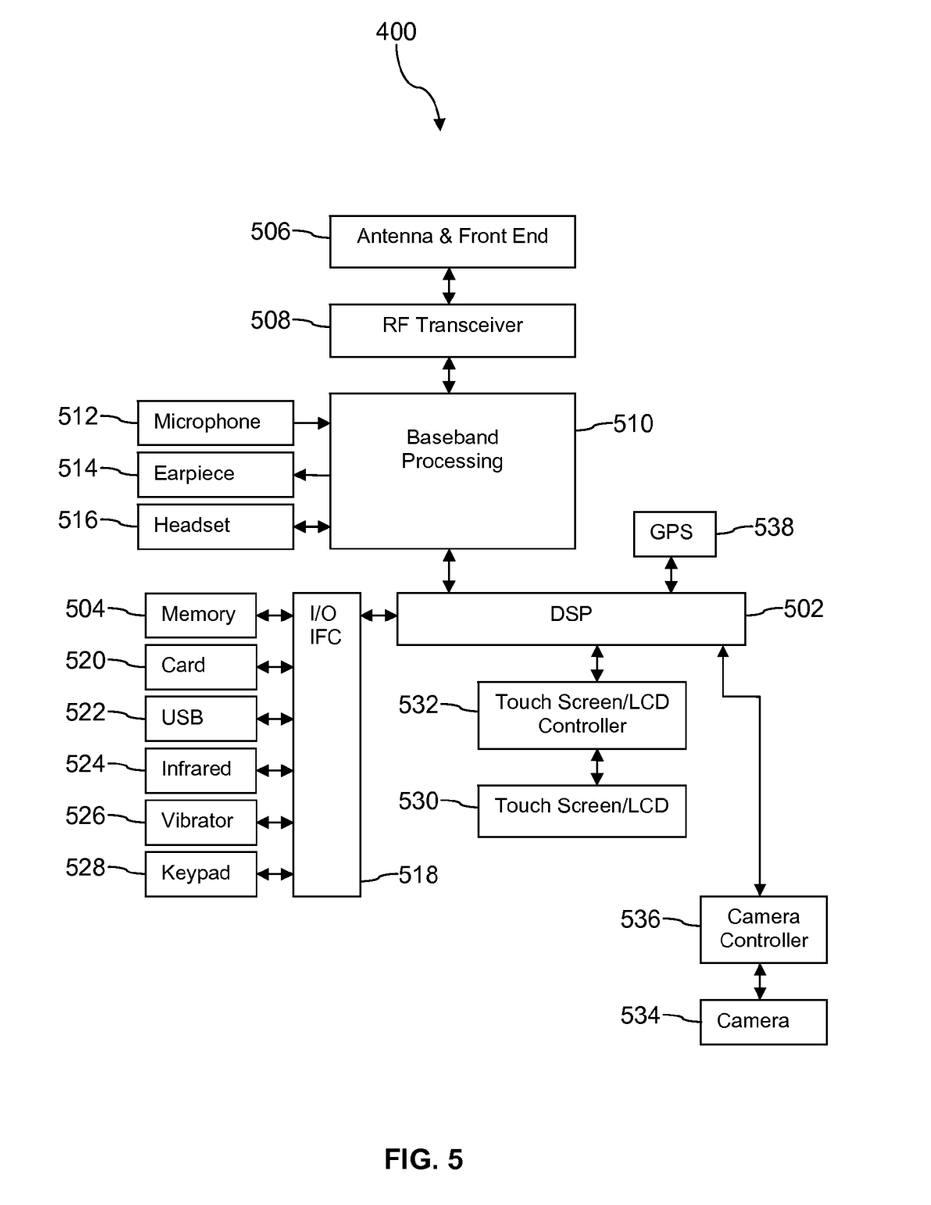
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
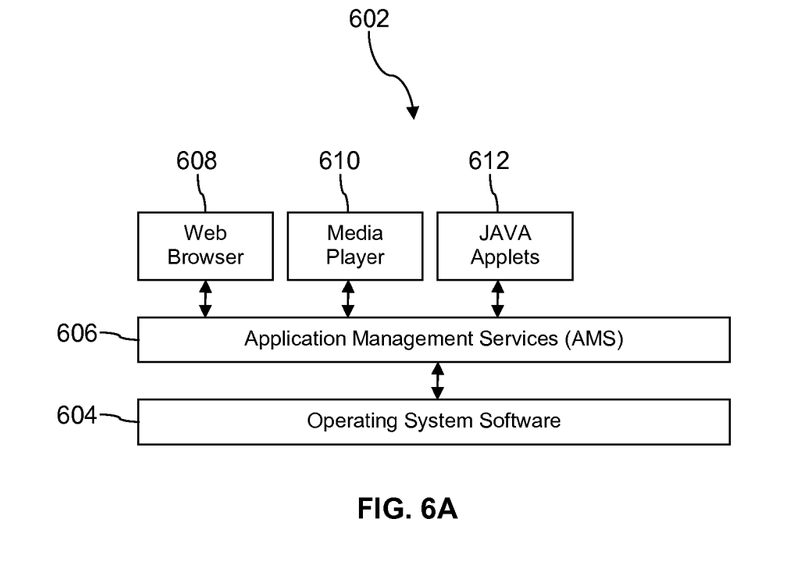
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
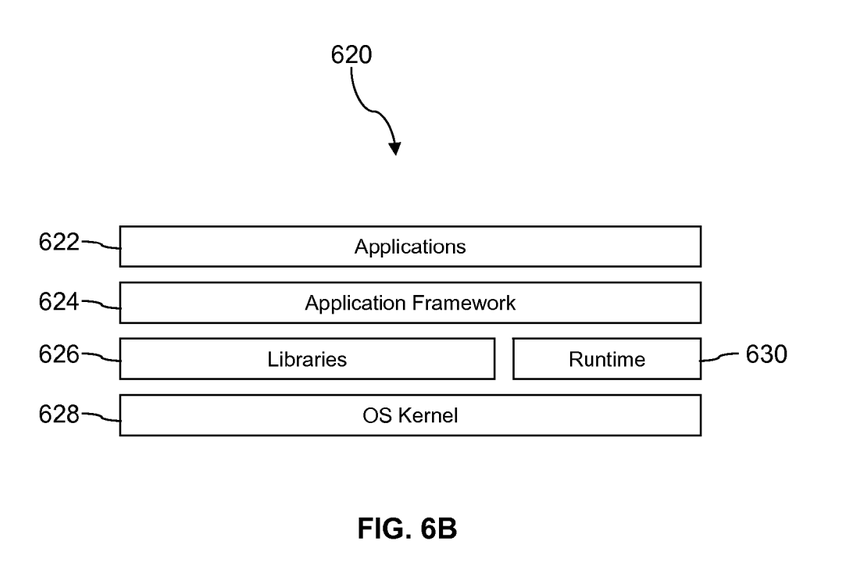

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
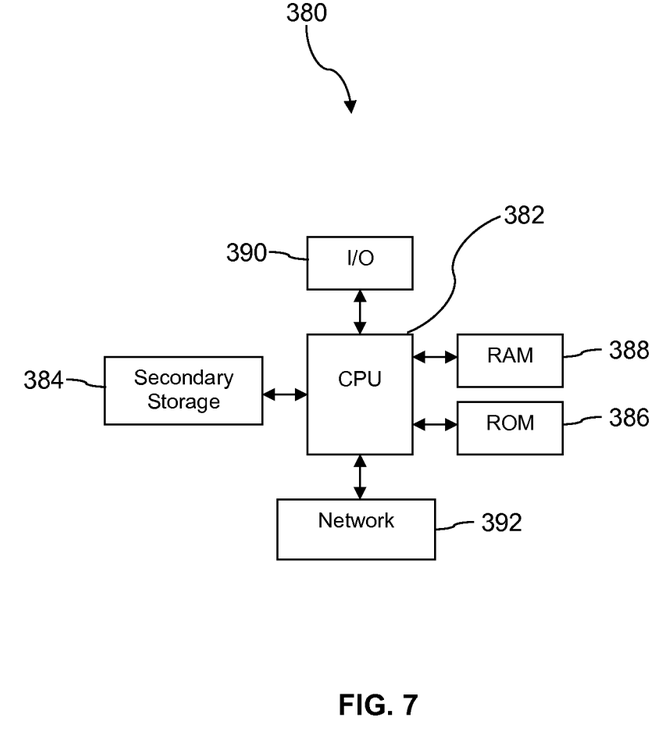
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selecting and sequentially sending a plurality of types of advertisements to a mobile communication device, the method comprising the following steps, all of which are performed by an ad gateway computer:

receiving a request for content from a mobile communication device, wherein the requested content comprises a first advertisement slot and a second advertisement slot, the second advertisement slot being located within the requested content at a position below the first advertisement slot such that the second advertisement slot is not initially displayed on the mobile communication device when the requested content is presented on a display of the mobile communication device;

in response to receiving the request for content that comprises a first advertisement slot and second advertisement slot, determining a current quality of service (QoS) level of a communication network based on latency, throughput, jitter, and error rate that the communication network is experiencing, wherein the ad gateway computer is coupled to the communication network;

determining a type of network connection by which the mobile communication device is coupled to the communication network;

determining a level of activity on the communication network corresponding to the type of network connection that couples the mobile communication device to the communication network;

based on determining the current QoS, the network connection type, and the level of activity on the communication network, determining that a first advertisement type can traverse the communication network and be delivered to the mobile communication device prior to displaying the first advertisement slot but the second advertisement type cannot traverse the communication network and be delivered to the mobile communication device prior to displaying the first advertisement slot due to the second advertisement type consuming more bandwidth than the first advertisement type, wherein the second advertisement type corresponds with a content size that has more bits than a content size corresponding to the first advertisement type, and wherein the first advertisement type comprises a static image type and the second advertisement type comprises at least one of an animation type, a video type, and a high definition video type;

based on determining that the first advertisement type can be delivered across the communication network prior to displaying the first advertisement slot and the second advertisement type cannot, selecting, from an advertisement data store in communication with the ad gateway computer, a first advertisement corresponding to the first advertisement type for filling the first advertisement slot and a second advertisement corresponding to the second advertisement type for filling the second advertisement slot;

sending the first advertisement to the mobile communication device for filling the first advertisement slot; and after sending the first advertisement to the mobile communication device, sending the second advertisement to the mobile communication device such that the second advertisement slot is filled with the second advertisement before the second advertisement slot is presented in the display of the mobile communication device and such that the second advertisement does not compete with the first advertisement for bandwidth in the communication network during sending to the mobile communication device.

2. The method of claim 1, wherein after the first advertisement is sent, the second advertisement is delayed and sent after a predefined period of time.

3. The method of claim 1, wherein the mobile communication device is a headset computer.

4. The method of claim 1, wherein there are 9 levels of QoS that are referred to as QoS class identifiers (QCI).

5. The method of claim 1, wherein QoS information is stored to at least one of a packet data network gateway (PGW) data store, a policy and charging rules function (PCRF) data store, or a subscriber data store that are coupled to the ad gateway server via the communication network.

6. A radio access network adaptive content delivery system, comprising:

an ad gateway computer communicatively coupled to a communication network, the ad gateway computer comprising:

a processor;

a non-transitory memory;

an application stored in the non-transitory memory that, when executed by the processor:

receives a request for content from a mobile communication device via the communication network, wherein the requested content comprises a first advertisement slot and a second advertisement slot, the second advertisement slot being located within the requested content at a position below the first advertisement slot such that the second advertisement slot is not initially displayed on the mobile communication device when the requested content is presented on a display of the mobile communication device, determines a type of network connection by which the mobile communication device is communicatively coupled to the communication network, determines a current quality of service (QoS) level of the communication network based on latency, throughput, jitter, and error rate that the communication network is experiencing, determines a level of activity on the communication network corresponding to the type of network connection that couples the mobile communication device to the communication network, based on the determination of the type of network connection, the current QoS level of the communication network, and the level of activity on the communication network, determines that a first advertisement type can traverse the communication network and be delivered to the mobile communication device prior to displaying the first advertisement slot but the second advertisement type cannot traverse the communication network and be delivered to the mobile communication device prior to display of the first advertisement slot due to the second advertisement type consuming more bandwidth than the first advertisement type, wherein the first advertisement type comprises a static image type and the second advertisement type comprises at least one of an animation type, a video type, and a high definition video type, based on the determination that the first advertisement type can be delivered across the communication network prior to displaying the first advertisement slot and the second advertisement type cannot, selects, from an advertisement data store in communication with ad gateway computer, a first advertisement of the first advertisement type for filling the first advertisement slot and a second advertisement of the second advertisement type for filling the second advertisement slot, wherein the second advertisement type selected for the second advertisement slot corresponds with a content size that has a greater number of bits than a content size corresponding to the first advertisement type selected for the first advertisement slot, receives the first advertisement and the second advertisement from the advertisement data store, and transmits the first advertisement to the mobile communication device prior to transmission of the second advertisement such that the second advertisement slot is filled with the second advertisement before the second advertisement slot is presented on the display of the mobile communication device and such that the second advertisement does not compete with the first advertisement for bandwidth in the communication network during transmission to the mobile communication device.

7. The system of claim 6, wherein the types of network connections that the mobile communication device uses to communicatively couple to the communication network comprise a 3G network connection, a 4G network connection, or a long term evolution (LTE) network connection.

8. The system of claim 7, wherein the mobile communication device wirelessly couples to the communication network according to at least one of a code division multiple access (CDMA) wireless protocol, a global system for mobile communications (GSM) wireless protocol, a long term evolution (LTE) wireless protocol, worldwide interoperability for microwave access (WiMAX) wireless protocol, or any combination thereof.

9. The system of claim 6, wherein the mobile communication device is a mobile phone.

10. The system of claim 6, wherein the mobile communication device is a personal digital assistant.

11. A method of selecting and sending a plurality of types of advertisements to a mobile communication device, the method comprising the following steps, all of which are performed by an ad gateway computer:

receiving a request from a mobile communication device for a webpage that comprises a first advertisement slot and a second advertisement slot, the second advertisement slot being located within the web page at a position below the first advertisement slot such that the second advertisement slot is not initially displayed on the mobile communication device when the web page is presented on a display of the mobile communication device, wherein the ad gateway computer is coupled to a communication network;

determining a type of network connection by which the mobile communication device is communicatively coupled to the communication network;

determining a current quality of service (QoS) level of the communication network based on latency, throughput, jitter, and error rate that the communication network is experiencing;

determining a level of activity on the communication network corresponding to the type of network connection that couples the mobile communication device to the communication network;

based on determining the network connection type, the current QoS level, and the level of activity on the communication network, determining that a first advertisement type can traverse the communication network and be delivered to the mobile communication device prior to displaying the first advertisement slot but the second advertisement type cannot traverse the communication network and be delivered to the mobile communication device prior to displaying the first advertisement slot due to the second advertisement type consuming more bandwidth than the first advertisement type, wherein the second advertisement type for the second advertisement slot corresponds with a content size that has a greater number of bits than a content size corresponding to the selected first advertisement type for the first advertisement slot, and wherein the first advertisement type comprises a static image type and the second advertisement type comprises at least one of an animation type, a video type, and a high definition video type;

based on determining that the first advertisement type can be delivered across the communication network prior to displaying the first advertisement slot and the second advertisement type cannot, selecting, from an advertisement data store in communication with the ad gateway computer, a first advertisement of the first advertisement type for filling the first advertisement slot and a second advertisement of the second advertisement type for filling the second advertisement slot, wherein the advertisement data store comprises a computer storing advertisements in non-transitory memory;

in response to selecting, receiving the first advertisement and the second advertisement from the advertisement data store; and transmitting the first advertisement to the mobile communication device prior to transmission of the second advertisement such that the second advertisement slot is filled with the second advertisement before the second advertisement slot is presented on the display of the mobile communication device and such that the second advertisement does not compete with the first advertisement for bandwidth in the communication network during transmission to the mobile communication device.

12. The method of claim 11, wherein there are 9 levels of QoS.

13. The method of claim 12, wherein level 9 represents a worst QoS and level 1 represents a best QoS level.

14. The method of claim 11, wherein there are 255 QoS levels.

15. The method of claim 11, wherein the mobile communication device sends a report about the mobile communication device to the ad gateway when the mobile communication device sends the request for the webpage.

\* \* \* \* \*